United States Patent [19]

Henton et al.

[11] Patent Number: 4,753,988

[45] Date of Patent: Jun. 28, 1988

[54] HIGH GLOSS ACRYLATE RUBBER-MODIFIED WEATHERABLE RESINS

[75] Inventors: David E. Henton, Midland, Mich.; Edward B. Anthony, Dalton, Ga.

[73] Assignee: The Dow Chemical Company, Midland, Mich.

[21] Appl. No.: 16,023

[22] Filed: Feb. 18, 1987

[51] Int. Cl.$^4$ .................. C08L 39/04; C08L 51/04
[52] U.S. Cl. .................................. 525/73; 525/71; 525/74; 525/75; 525/81; 525/85; 525/193; 525/228
[58] Field of Search ............... 525/71, 75, 85, 228, 525/73, 74, 78, 81, 193

[56] References Cited

U.S. PATENT DOCUMENTS 3,691,260  9/1972  Mittnacht et al. ............... 525/75

*Primary Examiner*—Jacob Ziegler

[57] ABSTRACT

Impact modified copolymers of vinyl aromatic, ethylenically unsaturated nitrile and, optionally, methyl methacrylate monomer, wherein the impact modifier comprises (a) large grafted rubber particles of a rubbery alkyl acrylate polymer having a particle size from about $0.5\mu$ to $0.8\mu$, 0.04 to 0.5 percent by weight of a polymerized crosslinking monomer and from 0.5 to 40 percent grafted rigid phase, and (b) small grafted rubber particles of a rubbery alkyl acrylate polymer having a particle size from about $0.05\mu$ to about $0.20\mu$, 0.25 to about 2.0 percent of a crosslinking monomer, provided that the weight percentage of crosslinking monomer is at least twice the weight percentage of the crosslinking monomer in the large particle, and from about 15 to about 60 percent by weight grafted rigid phase.

16 Claims, No Drawings

HIGH GLOSS ACRYLATE RUBBER-MODIFIED WEATHERABLE RESINS

BACKGROUND OF THE INVENTION

The present invention relates to thermoplastic resins containing rubbery grafted acrylate rubber particles. More particularly, the present invention relates to acrylate rubber-modified styrene acrylonitrile copolymer resins having improved impact strength weatherability, and surface appearance.

It is previously known in the art to prepare impact-modified thermoplastic resins and, in particular, copolymers of styrene and acrylonitrile, wherein the impact-modifying rubber is a homopolymer or copolymer of an alkyl acrylate having from 2 to about 10 carbon atoms in the alkyl group and having one or more distinct particle sizes. In U.S. Pat. No. 4,442,263, there is disclosed a resin having a large rubber particle size of a volume average particle size from about 5,000 Angstroms to about 8,000 Angstroms, a crosslinker content from about 0.5 percent to about 10 percent by weight, preferably 1 percent to about 5 percent by weight, and grafting levels of about 20 percent to about 60 percent, and preferably 40 percent to about 50 percent. In U.S. Pat. No. 4,224,419, there is disclosed a weatherable resin having both large and small particles of acrylate rubber. The large particle component has a weight (volume) average particle diameter of about 2000 Å to 5,000 Å and a graft level of 20 percent to 40 percent. The small particle component has a weight (volume) average particle diameter of about 500 Å to 1500 Å and a graft level of 25 percent to 45 percent. The amount of crosslinker in both the large and small rubber particles is 0.5 percent to 10.0 percent (preferably from 1.0 percent to 5.0 percent). It was not taught that there was any advantage in having significantly higher levels of crosslinking monomer in the small particle than in the large particle or that very low levels of crosslinker in the large particle (less than 0.5 percent) provided improved rubber toughened vinyl aromatic resins. Additional examples of acrylate rubber-modified styrene/acrylonitrile resins are disclosed in U.S. Pat. Nos. 3,691,260; 3,793,402; 3,992,485; 4,082,895; 4,341,883; 3,830,878; 4,433,102; and 4,224,419. For the teachings contained therein, the previously mentioned patents are incorporated herein by reference thereto.

Previously known resins including resins containing more than one rubber particle size have failed to achieve optimum properties. In particular, previously known resins have proven deficient in one or more physical properties such as impact strength, weatherability, or surface appearance.

It would be desirable to provide an acrylate rubber-modified styrene/acrylonitrile resin having an improved balance of properties.

SUMMARY OF THE INVENTION

According to the present invention, there is now provided an alkyl acrylate rubber-modified vinyl aromatic/ethylenically unsaturated nitrile resin having an improved balance of physical properties and comprising in blended form:

(1) matrix polymer in an amount from about 90 percent to about 60 percent by weight comprising an interpolymer of vinyl aromatic and ethylenically unsaturated nitrile and, optionally, methyl methacrylate; and (2) grafted rubbery alkyl acrylate polymer elastomer phase in an amount from about 10 percent to about 40 percent by weight, wherein the elastomer phase comprises:
  (a) large rubber particles having volume average particle size from about $0.50\mu$ to about $0.80\mu$, comprising in polymerized form from about 0.04 percent to about 0.5 percent by weight of a crosslinking monomer and from about 5.0 percent to about 40 percent by weight of grafted rigid phase; and
  (b) small rubber particles having volume average particle size from about 0.05 to about $0.20\mu$, comprising in polymerized form from about 0.25 to about 2.0 percent of a crosslinking monomer, and from about 15 percent to about 60 percent by weight of grafted rigid phase;

provided that the percentage of polymerized crosslinking monomer in the small rubber particles is at least twice the percentage of crosslinking monomer in the large particle, and the weight ratio of large rubber particles to small rubber particles is 5-80/95-20.

DETAILED DESCRIPTION OF THE INVENTION

The matrix polymer preferably comprises a copolymer of styrene and acrylonitrile and optionally methylmethacrylate. Examples include such co- and terpolymers prepared by any suitable polymerization process such as emulsion, suspension, solution or bulk polymerizations or a mixture thereof. An especially preferred matrix is styrene/acrylonitrile copolymer.

The alkyl acrylate monomers employed in the preparation of the homopolymer and copolymer rubbers used in the present invention contain from 2 to about 10 carbon atoms in the alkyl group. A preferred alkylacrylate is butylacrylate. The rubbery alkyl acrylate copolymers may additionally comprise up to about 20 percent by weight of a copolymerizable monoethylenically unsaturated comonomer. Suitable comonomers include those selected from the group consisting of alkenylaromatic monomers corresponding to the formula:

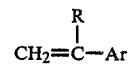

wherein R is hydrogen or methyl and Ar is an aromatic group including various $C_{1-4}$ alkyl and halo-ring substituted aromatic groups of from 6 to about 10 carbon atoms, a cyanoalkenyl monomer corresponding to the formula:

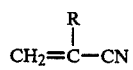

wherein R is as previously defined, and ethylenically unsaturated carboxylic acids and derivatives thereof corresponding to the formula:

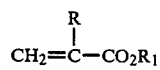

wherein R is a previously defined, and $R_1$ is hydrogen or $C_{1-8}$ alkyl. Examples of suitable copolymerizable comonomers include styrene, α-methylstyrene, acrylonitrile, methyl methacrylate, and mixtures thereof.

The crosslinking monomers employed in combination with the alkyl acrylate and optional copolymerizable comonomer include polyvinyl substituted aliphatic and aromatic compound having from about 6 to about 20 carbons previously known and employed in the art as crosslinking agents. Examples include divinylbenzene, trimethylolpropane triacrylate (TMPTA), and mono-, di-or polyalkylene or cycloalkylene glycol-acrylates, and dimethacrylates such as butylene glycol diacrylate, ethylene glycol diacrylate, polyethylene glycol diacrylate, polyethylene glycol dimethacrylate, tricyclodecenyl acrylate, etc.

The rubbery alkyl acrylate particles are prepared by emulsion polymerization techniques well known to the skilled artisan. Known free radical inducing initiators may be employed in the polymerization reactions. These suitably include the inorganic and organic peroxides and hydroperoxides, potassium, sodium, and ammonium persulfates, and the like equivalent initiators. Effective quantities of initiator to be employed generally range from about 0.01 to about 1 percent, preferably from about 0.05 to about 0.5 percent by weight. Various chain transfer agents well known to those skilled in the art may be utilized for the purpose of controlling the molecular weight of the various polymers formed in preparing the rubbery particles. For such purpose, alkyl mercaptans are a very good choice. Other factors such as temperature, initiator level, and process variables known to those skilled in the art also can be used to modify the molecular weight.

In the large rubber particle, it is preferred that the amount of crosslinker vary from about 0.06 percent to about 0.25 percent by weight.

The large rubber particle preferably comprises a core of crosslinked rubbery alkyl acrylate polymer and a shell of a relatively easily graftable alkyl acrylate rubber (graft-linkable shell) and a final overcoat of a rigid phase which is grafted to the particle. The rigid phase may also be crosslinked if desired. As previously mentioned, the small rubber particle contains at least twice as much crosslinking monomer as measured on a percent by weight basis than is contained in the large particle. The graft-linkable shell layer preferably comprises a copolymer of the alkyl acrylate and a graft-linking monomer capable of imparting improved grafting with the grafted rigid phase. Examples of suitable graft-linking monomer include allyl methacrylate, allyl acrylate, allyl maleate, allyl methyl ether, diallylphthalate, di- or triallyl isocyanurate, di- or triallyl cyanurate, or mixtures thereof. Such graft-linking monomer is generally employed in an amount from about 0.01 to about 2.0 percent by weight based on total particle weight. A crosslinking monomer may also be employed in the preparation of the graft-linkable shell if desired. Certain of the graft-linking monomers which are polyfunctional, form crosslinks themselves. Preferably the graft linkable shell comprises from about 5 to about 20 percent of the total weight of the rubber particle.

The rigid phase which is attached to the rubber particle in a grafting reaction is preferably one which is miscible with the matrix into which the rubbery polymers are blended according to the invention. Preferred rigid phase polymers are copolymers of vinyl aromatic and unsaturated nitrile monomers optionally additionally comprising $C_{1-4}$ alkyl methacrylate. Examples include copolymers of styrene and acrylonitrile. A preferred $C_{1-4}$ alkyl methacrylate is methyl methacrylate present in an amount up to about 50 percent by weight. Particularly preferred hard phase copolymers comprise in polymerized form 10 to 90 percent styrene, 5 to 40 percent acrylonitrile, and 0 to 50 percent methyl methacrylate. The preceeding percentages being measured on a weight basis and the total equaling 100 percent. The ratio of grafted rigid phase to rubber phase in the large rubber particles is preferably from about 0.05 to about 0.2, i.e., a percent grafting from about 5 percent to about 20 percent. It is well known that during the grafting reaction, free (unattached) rigid phase is also formed. Depending on the grafting efficiency, more or less rigid phase must be polymerized in order to obtain 5–20 percent grafting.

The small rubber particles in the invented resin contain higher levels of copolymerized crosslinker than do the large particles. Preferred levels of crosslinker are from about 0.5 percent to about 0.9 percent by weight and again are at least twice the level employed in the large particle. Moreover, in a preferred embodiment, the small particle component also comprises a core of a rubbery polymer and a shell of an easily graftable rubber (graftlinkable shell). Generally, the graftlinkable shell is prepared from components as previously described for the large particle and comprises up to about 30 percent by weight of the total weight of the small rubber particle. As previously mentioned, the small particle rubber component also comprises grafted hard phase in a ratio of grafted phase to rubber phase of about 0.15 to about 0.60, that is, graft levels on a weight basis from about 15 to about 60 percent.

The grafted rigid phase is prepared in the manner previously disclosed utilizing the monomers previously disclosed with regard to the rigid phase of the large rubber particle.

Having described the invention the following examples are provided as further illustrative and are not to be construed as limiting.

Small Particle Preparation

Into a 20 gallon glass-lined reactor was placed 29,851 g $H_2O$, 75.8 g $NaHCO_3$, 43.0 g acetic acid, and 858 g of 300 A polystyrene seed latex, (ca 33 percent active). The contents were evacuated and purged two times with nitrogen, and then 25.3 g sodium formaldehyde sulfoxolate in 3000 g of $H_2O$ was added. The reactor was heated to 65° C. while agitating at 150 rpm. When the temperature reached 65° C., an aqueous conadd stream was started which contained 0.0589 percent $Na_2S_2O_8$, 4.26 percent active sodium dodecyl benzene sulfonate soap, and the balance $H_2O$. Five minutes later, a monomer stream containing 99.5 percent n-butylacrylate and 0.50 percent TMPTA was started. A total of 25,270.0 g of monomers was added over a 5 hour period and 21,428.8 g of aqueous conadd were added over a 5⅓ hour period. The latex was retained at 65° C. for 2.75 hours after the aqueous conadd had finished. The final monomer conversion was 95 percent (31 percent solids) and the volume average particle size was 1450 Å. The swelling index of the core rubber was 15.5 as measured in methyl ethyl ketone.

Addition of Graftlinkable Shell

To 57,000 g the above prepared core rubber latex (17,793 g rubber solids) at 65° C. was added simultaneously a monomer conadd mixture of n-butylacrylate-/allyl methacrylate (95/5) and an aqueous stream containing 0.060 percent $Na_2S_2O_8$, 4.26 percent active sodium dodecyl benzene sulfonate soap, and the balance $H_2O$. A total of 4448 g of the monomer mixture was added over a 1 hour period and 6014 g of aqueous solution was added over a 2 hour period. This latex was retained at 65° C. for two hours after the aqueous conadd had finished. The final core/shell particle had a volume average particle size of 1627 Å and the monomer conversion was 98.2 percent (34.0 percent solids). The core/shell rubber had a swelling index of 11.3 in methyl ethyl ketone.

Addition of Graft Polymer

Into a glass lined reactor was loaded 38,230.7 g of the previously prepared core/shell rubber latex (13,233 g rubber). The reactor was heated to 85° C. after evacuating and purging with nitrogen three times. The agitation rate was 150 rpm, and the monomer and aqueous conadd mixtures were added simultaneously over a 7 hour period. A total of 15,041 g of a mixture of styrene/acrylonitrile (75/25) containing 11.3 g of n-octylmercaptan was added and 20,501 g of an aqueous mixture was added which contained 0.214 percent $Na_2S_2O_8$, 1.43 percent active sodium dodecyl benzene sulfonate soap, and the balance $H_2O$. The latex was retained at 85° C. for 0.5 hour after the conadd streams finished resulting in a final monomer conversion of 97 percent (37.2 percent solids) and a volume average particle size of 2100 Å. The latex was steam stripped to remove volatiles, stabilized, and the polymer isolated by freeze coagulation.

The resulting grafted rubber concentrate (identified as GRC-A) contained 45.0 percent rubber and had a weight ratio of graft to rubber (G/R) of 0.26 (26 percent graft) as determined by extraction in methyl ethyl ketone. The rigid phase had Mw=231,000 and Mn=57,000.

Large Particle Preparation, Core Rubber

Into a one gallon glass-lined pipe reactor was placed 975 g of water, 1.50 g $NaHCO_3$, 2.3 g acetic acid, and 19.3 g of butylacrylate rubber latex (7.2 g active, ca 1000 Å). The reactor was agitated at 150 rpm and the contents thoroughly deoxygenated by carefully evacuating and purging three times with $N_2$. To this oxygen-free reactor was added 1.0 g of sodium formaldehyde sulfoxolate in 125 ml of oxygen-free water. The reactor was heated to 65° C. and a monomer mixture consisting of butylacrylate (99.925 percent) and TMPTA (0.075 percent) and an aqueous mixture consisting of 0.0504 percent $Na_2S_2O_8$ and 1.39 percent active sodium dodecyl benzene sulfonate soap were added at the following staged rates. Monomer mixture: 70.0 g/hr for 1.5 hours, then 296 g/hr for 3.0 hours; Aqueous mixture: 76.7 g/hr for 4.0 hours, then 139.5 g/hr for 1.5 hour.

A total of 1014 g of monomer mixture and 490 g of aqueous mixture were added. The aqueous mixture addition finished 0.5 hour after the monomer mixture and then the latex was heated for 1 hour at 65° C.

The final latex has 91.5 percent conversion (36.0 percent solids) and the volume average particle size was 4855 Å. The swelling index in methyl ethyl ketone was 9.8. The gel content was 92.1 percent.

Addition of Graftlinkable Shell

To the above prepared large particle core latex at 65° C. was added over a 1 hour period, 112 g of a monomer mixture containing 95 percent butylacrylate/5 percent allyl methacrylate, and over a 2 hour period, 145.8 of an aqueous mixture containing 0.0504 percent $Na_2S_2O_8$ and 1.39 percent active sodium dodecyl benzene sulfonate soap solution. The latex was heated at 65° C. for 3 hours after addition of the aqueous mixture was finished. The latex solids were 36.7 percent, the volume average particle size of the particle was 5034 Å, the swelling index was 8.4 in methyl ethyl ketone, and the gel content was 92.7 percent. The graftlinkable shell comprised 10 percent by weight of the total rubber particle.

Addition of Graft Polymer to Large Particle Core/Shell

Into a one gallon glass-lined reactor was placed 1280 g of the previously described 5034 Å core/shell rubber latex and 100 g of $H_2O$. The reactor contents were agitated at 150 rpm, purged with $N_2$, evacuated three times and heated to 85° C. When the temperature reached 85° C., the addition of both aqueous mixture and monomer mixture was started. 352 g of a monomer mix containing styrene/acrylonitrile (75/25) and 0.26 g of n-octylmercaptan were added over a 4 hour period. A total of 458 g of an aqueous mixture containing 0.222 percent $Na_2S_2O_8$ and 0.739 percent active sodium dodecyl benzene sulfonate soap was added over the same 4 hour period. The latex was cooked at 85° C. for 1.5 hours, sampled, steam stripped, and stabilized. The final solid content was 37.6 percent, the product contained 62.0 percent rubber and had a G/R of 0.08 (8 percent graft) as determined by extraction in methyl ethyl ketone. The product was identified as GRC-B.

Blending

Blends of the separately prepared and grafted large and small particle grafted resins were prepared by compounding on a 0.8" Welding Engineers extruder at 165° C. to 204° C. and injection molding at 425° F./450° F. barrel temperature, 110° F. mold temperature using a 2 oz Negri Bossi injection molding machine. Compositions and properties of these 30 percent rubber blends are shown in Tables I and II.

TABLE I

| Blend | Composition | Particle Ratio Large/Small |
|---|---|---|
| 1 | 48.4% GRC-B 51.6% SAN* | 100/0 |
| 2 | 12.1% GRC-B 50.0% GRC-A 37.9% SAN* | 25/75 |
| 3 | 8.2% GRC-B 56.7% GRC-A 35.1% SAN* | 15/85 |
| 4 | 66.7% GRC-A 33.3% SAN* | 0/100 |

*Tyril ® 111 brand styrene/acrylonitrile resin available from The Dow Chemical Company.

TABLE II

| Blend | Large Particle Rubber Amount in Blend (%) | % x-linker | G/R | Small Particle Rubber Amount in Blend (%) | % x-linker | G/R | Notched Izod*** | 60° Gloss*** |
|---|---|---|---|---|---|---|---|---|
| 1* | 30 | 0.075 | 0.08 | 0 | NA | NA | 5.7 | 66 |
| 2 | 7.5 | 0.075 | 0.08 | 22.5 | 0.50 | 0.26 | 6.4 | 80 |
| 3 | 4.5 | 0.075 | 0.08 | 25.5 | 0.50 | 0.26 | 7.4 | 88 |
| 4* | 0 | NA | NA | 30 | 0.50 | 0.26 | 1.5 | 90 |

*Not an example of the present invention.
**ft-lbs/in notch
***Gardner gloss

It may be seen by reference to Table II that improved properties are obtained for the blends which contain both large and small particles particularly where the large particles have a very low graft level (8 percent), a very low crosslinker level (0.075 percent) and the small particle contains 6.7 times more crosslinker than the large particle.

Additional blends were prepared from resins prepared in a manner similar to those previously described but containing more crosslinker in the large particle. Thus, GRC C was prepared containing 56.6% n-butylacrylate rubber and having a volume average diameter of 5000 Å. The rubber core contained 0.25% trimethylolpropane triacrylate crosslinker. The SAN grafted large particle resins, SAN grafted small particle resins and additional SAN (Tyril® 111) were compounded and injection molded as described for Table II. The compositions are contained in Table III and test properties are reported in Table IV.

TABLE III

| Blend | Composition | Particle Ratio Large/Small |
|---|---|---|
| 5 | 55.6% GRC A<br>44.4% SAN* | 0/100 |
| 6 | 11.1% GRC A<br>41.7% GRC C<br>47.2% SAN* | 25/75 |
| 7 | 22.1% GRC A<br>27.8% GRC C<br>50.1% SAN* | 50/50 |
| 8 | 44.2% GRC C<br>55.8% SAN* | 100/0 |

*Tyril® III brand styrene/acrylonitrile resin available from The Dow Chemical Company.

TABLE IV

| Blend | Large Particle Rubber Amount in Blend (%) | % x-linker | G/R | Small Particle Rubber Amount in Blend (%) | % x-linker | G/R | Notched Izod*** | 60° Gloss*** |
|---|---|---|---|---|---|---|---|---|
| 5* | 0 | NA | NA | 25.0 | 0.50 | 0.26 | 1.0 | 91 |
| 6 | 6.2 | 0.25 | 0.11 | 18.8 | 0.50 | 0.26 | 2.1 | 88 |
| 7 | 12.5 | 0.25 | 0.11 | 12.5 | 0.50 | 0.26 | 2.8 | 84 |
| 8* | 25.0 | 0.25 | 0.11 | 0 | NA | NA | 1.8 | 79 |

*Not an example of the present invention.
**ft-lbs/in notch
***Gardner Gloss

It may be seen by reference to Table IV that improved properties are obtained for the blends which contain both large and small particles where the large particles have a low graft level (11%), a low crosslinker level (0.25%) and the small particle contains twice the crosslinker level of the large particle.

What is claimed is:

1. A thermoplastic resin composition comprising:
   (1) rigid phase polymer in an amount from about 90 percent to about 60 percent by weight comprising an interpolymer of a vinyl aromatic monomer, an ethylenically unsaturated nitrile, and, optionally, methyl methacrylate; and
   (2) grafted rubbery alkyl acrylate polymer elastomer phase in an amount from about 10 percent to about 40 percent by weight, wherein the elastomer phase comprises:
      (a) large rubber particles having volume average particle size from about $0.50\mu$ to about $0.80\mu$, comprising in polymerized form from about 0.04 percent to about 0.5 percent by weight of a crosslinking monomer and from about 5.0 percent to about 40 percent by weight of grafted rigid phase; and
      (b) small rubber particles having volume average particle size from about 0.05 to about $0.20\mu$, comprising in polymerized form from about 0.25 to about 2.0 percent of a crosslinking monomer, and from about 15 percent to about 60 percent by weight of grafted rigid phase,
   provided that the percentage of polymerized crosslinking monomer in the small rubber particles is at least twice the percentage of crosslinking monomer in the large particle, and the weight ratio of the large rubber particle/small rubber particle is 5-80/95-20.

2. A composition according to claim 1, wherein the alkyl acrylate polymer rubber particle comprises a crosslinked homopolymer of a $C_{2-10}$ alkyl acrylate or a crosslinked copolymer of a $C_{2-10}$ alkyl acrylate with up to about 20 percent by weight of a copolymerizable comonomer.

3. A composition according to claim 2, wherein the copolymerizable comonomer is selected from the group consisting of alkenyl aromatic monomers corresponding to the formula:

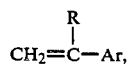

cyanoalkenyl monomers corresponding to the formula:

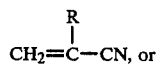

ethylenically unsaturated carboxylic acids and derivatives thereof corresponding to the formula:

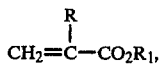

wherein R is hydrogen or methyl, $R_1$ is hydrogen or $C_{1-8}$ alkyl and Ar is an aromatic group including $C_{1-4}$ alkyl or halo ring substituted aromatic groups of from 6 to 10 carbon atoms.

4. A composition according to claim 3, wherein the copolymerizable comonomer is styrene, α-methylstyrene, acrylonitrile, methyl methacrylate or a mixture thereof.

5. A composition according to claim 1, wherein the crosslinking monomer comprises a polyvinyl substituted aliphatic or aromatic compound having from about 6 to about 20 carbons.

6. A composition according to claim 5, wherein the crosslinking monomer is divinylbenzene, trimethylol propane triacrylate, tricyclodecenyl acrylate, butylene glycol diacrylate, ethylene glycol diacrylate, or polyethylene glycol diacrylate, polyethylene glycol dimethacrylate, or mixtures thereof.

7. A composition according to claim 1, wherein the large rubber particle comprises from about 0.06 to about 0.25 percent by weight of a crosslinking monomer.

8. A composition according to claim 1, wherein the large rubber particles are in the form of a core of a rubbery polymer and a graftlinkable rubbery shell wherein the rubbery shell comprises from about 5 percent to about 20 percent of the total weight of the rubber particle and, additionally, comprises in polymerized form a graft-linking monomer.

9. A composition according to claim 8, wherein the graftlinking monomer is employed in an amount from about 0.01 to about 2.0 percent by weight based on total particle weight.

10. A composition according to claim 9, wherein the graft-linking monomer is selected from the group consisting of allyl methacrylate, allyl acrylate, diallyl maleate, allyl methyl ether, diallylphthalate, di- or triallylisocyanurate, di- or triallylcyanurate, and mixtures thereof.

11. A composition according to claim 1, wherein the grafted rigid phase grafted to the large rubber particles comprises in polymerized form from about 10 to about 90 percent by weight styrene, from about 15 to about 40 percent by weight acrylonitrile, and 0 to about 50 percent by weight methyl methacrylate.

12. A composition according to claim 1, wherein the small rubber particles comprise from about 0.5 to about 0.9 percent by weight of a crosslinking monomer.

13. A composition according to claim 1, wherein the small rubber particles comprise a core of a rubbery polymer and a shell of an easily graftable rubber, wherein the shell comprises up to about 30 percent of the small rubber particle weight and is comprised of a polymer of a $C_{2-10}$ alkyl acrylate and a copolymerizable graftlinking monomer.

14. A composition according to claim 1, wherein the small particle has grafted thereto rigid phase comprising in polymerized form by weight from 10 to 90 percent styrene, from 5 to 40 percent acrylonitrile, and from 0 to 50 percent methyl methacrylate.

15. A composition according to claim 1, wherein the matrix polymer and the grafted rigid phase polymer are the same.

16. A composition according to claim 15, wherein the matrix polymer and grafted rigid phase polymer are styrene and acrylonitrile copolymers.

* * * * *